*US007853953B2*

United States Patent
Devarakonda et al.

(10) Patent No.: US 7,853,953 B2
(45) Date of Patent: Dec. 14, 2010

(54) METHODS AND APPARATUS FOR SELECTIVE WORKLOAD OFF-LOADING ACROSS MULTIPLE DATA CENTERS

(75) Inventors: Murthy V. Devarakonda, Peekskill, NY (US); Daniel Manuel Dias, Mohegan Lake, NY (US); Graeme N. Dixon, Carmel, NY (US); Vijay K. Naik, Pleasantville, NY (US); Giovanni Pacifici, New York, NY (US); Nithya Rajamani, Tarrytown, NY (US); Daniela Rosu, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 263 days.

(21) Appl. No.: 11/140,429

(22) Filed: May 27, 2005

(65) Prior Publication Data

US 2006/0271544 A1    Nov. 30, 2006

(51) Int. Cl.
    *G06F 9/46*    (2006.01)
(52) U.S. Cl. ..................................... 718/105
(58) Field of Classification Search ................. 718/105; 707/2; 709/223
    See application file for complete search history.

(56) References Cited

U.S. PATENT DOCUMENTS

| | | | |
|---|---|---|---|
| 4,839,798 A | | 6/1989 | Eguchi et al. |
| 5,504,894 A | * | 4/1996 | Ferguson et al. ............... 707/2 |
| 5,578,988 A | * | 11/1996 | Hoseit et al. ................. 340/522 |
| 2002/0091810 A1 | * | 7/2002 | Hundscheidt et al. ....... 709/223 |
| 2004/0250250 A1 | | 12/2004 | Hamilton, II et al. |
| 2005/0108712 A1 | | 5/2005 | Goyal |
| 2006/0047751 A1 | * | 3/2006 | Chen et al. ................... 709/205 |

FOREIGN PATENT DOCUMENTS

EP    0828214    3/1998

OTHER PUBLICATIONS

U.S. Appl. No. 10/763,135, filed Jan. 22, 2004, Dan et al.
Cisco Systems, Inc. "Multi-Site Load Distribution Using DNS," Version 1.0, pp. 1-22, Mar. 2004.
M. Pistoia et al., IBM Websphere Performance Pack: Load Balancing with IBM SecureWay Network Dispatcher, International Technical Support Organization, Redbooks IBM, SG24-5858-00, Oct. 1999.
Supplementary EP Search Report for EP 05 80 2961 dated Dec. 18, 2008.

* cited by examiner

*Primary Examiner*—Li B Zhen
*Assistant Examiner*—Eric C Wai
(74) *Attorney, Agent, or Firm*—Kenneth R. Corsello; Ryan, Mason & Lewis, LLP

(57) ABSTRACT

Techniques for selectively off-loading workload across multiple data centers are disclosed. For example, a technique for processing a user request in accordance with a multiple data center environment comprises the following steps/operations. A user request is obtained at a first data center. The user request is classified based on one or more classification criterion. At least a portion of a workload associated with the classified user request is off-loaded to at least a second data center to be processed, wherein the off-loading step/operation is at least based on one or more administrative policies associated with at least one of the first data center and the second data center. The workload is processed such that the user request is at least substantially satisfied in accordance with a service level agreement for the requesting user.

16 Claims, 5 Drawing Sheets

METHODS AND APPARATUS FOR SELECTIVE WORKLOAD OFF-LOADING ACROSS MULTIPLE DATA CENTERS

FIELD OF THE INVENTION

This present invention generally relates to computing resources and data centers and, more particularly, to techniques for selectively off-loading workload across multiple data centers.

BACKGROUND OF THE INVENTION

Large enterprises organize their computing resources into multiple data centers, each data center being a pool of computing resources and storage that may be physically separated from the other data centers. Enterprise applications run in one or more data centers and the end users' requests to the applications flow into one or more datacenters. When a data center is overloaded with the requests, it is necessary to offload some of the workload to available shared resources in other data centers so that the end users receive an expected level of application response and also that all resources of the enterprise are used effectively.

In a variation of the multi-data center model, an enterprise might purchase resources from a third party service provider and use those resources as a data center of its own. The need for offloading workload to the service provider resources exists in this model, as well, as it is similar to the multi-datacenter workload offloading problem.

Existing solutions to workload off-loading include a weighted round-robin distribution of user requests using Domain Name Service (DNS) or Transmission Control Protocol/Internet Protocol (TCP/IP) routing products. The problem with this solution is that the routing products are only capable of statically routing user requests in a certain proportion (i.e., based on weights), but they are not capable of dynamically adjusting resource allocation to user requests based on service level agreements.

SUMMARY OF THE INVENTION

Principles of the present invention provide techniques for selectively off-loading workload across multiple data centers.

For example, in one aspect of the invention, a technique for processing a user request in accordance with a multiple data center environment comprises the following steps/operations. A user request is obtained at a first data center. The user request is classified based on one or more classification criterion. At least a portion of a workload associated with the classified user request is off-loaded to at least a second data center to be processed, wherein the off-loading step/operation is at least based on one or more administrative policies associated with at least one of the first data center and the second data center. The workload is processed such that the user request is at least substantially satisfied in accordance with a service level agreement for the requesting user.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

As will be illustratively explained herein below, principles of the invention provide techniques for classifying user requests and dynamically routing and processing the request to a data center in such way that the service level objectives of a user request class are met while conforming to policies of each data center.

The client requests may be classified by type of clients (e.g., gold class, silver class, bronze class), type of workload that generated the client requests, by the type of the data accesses performed by the transactions or by the type of operations performed on the data accessed by the workload. Based on this classification, client requests can be selectively routed to resources at a remote data center based on policies and the current state of the data centers (local and remote).

It is to be understood that a "local" data center is generally considered a data center that first receives the subject user request. This may be a data center that is close in proximity to the client device and/or one that ordinarily handles such user requests based on one or more criterion (e.g., subject matter, client type, etc.). Thus, a "remote" data center is generally considered a data center other than the local data center. Based on the context, it is also to be understood that the terms "requester" and "provider" are used to refer to the local and remote data centers, respectively.

By way of example, requests from bronze clients, or relatively low priority requests, may be routed to remote resources, when the local data center has a high load. The routing may also depend on the communications or data access requirements of the requests. For example, a request with a transaction or query resulting in significant data access from a database or a request resulting in parallel computations with high degree of communications would be routed locally for processing. The selection of a workload for remote processing may also depend upon whether the data accessed by the resulting transactions can be partitioned and/or replicated at the remote data center. The routing may also depend on the resource requirements of the workload to be routed. Workload operations requiring commodity processors could be offloaded, but ones that require vector processing capability for example could be routed locally. The incentive for sharing resources by peer data centers could be monetary or reputation or policy based, depending on the organizational economic model.

Thus, in accordance with principles of the invention, workload (e.g., user requests) is selectively offloaded to other data centers to meet service level agreements of user requests while allowing administrative control of resource sharing via explicit policies.

Figure 1A:
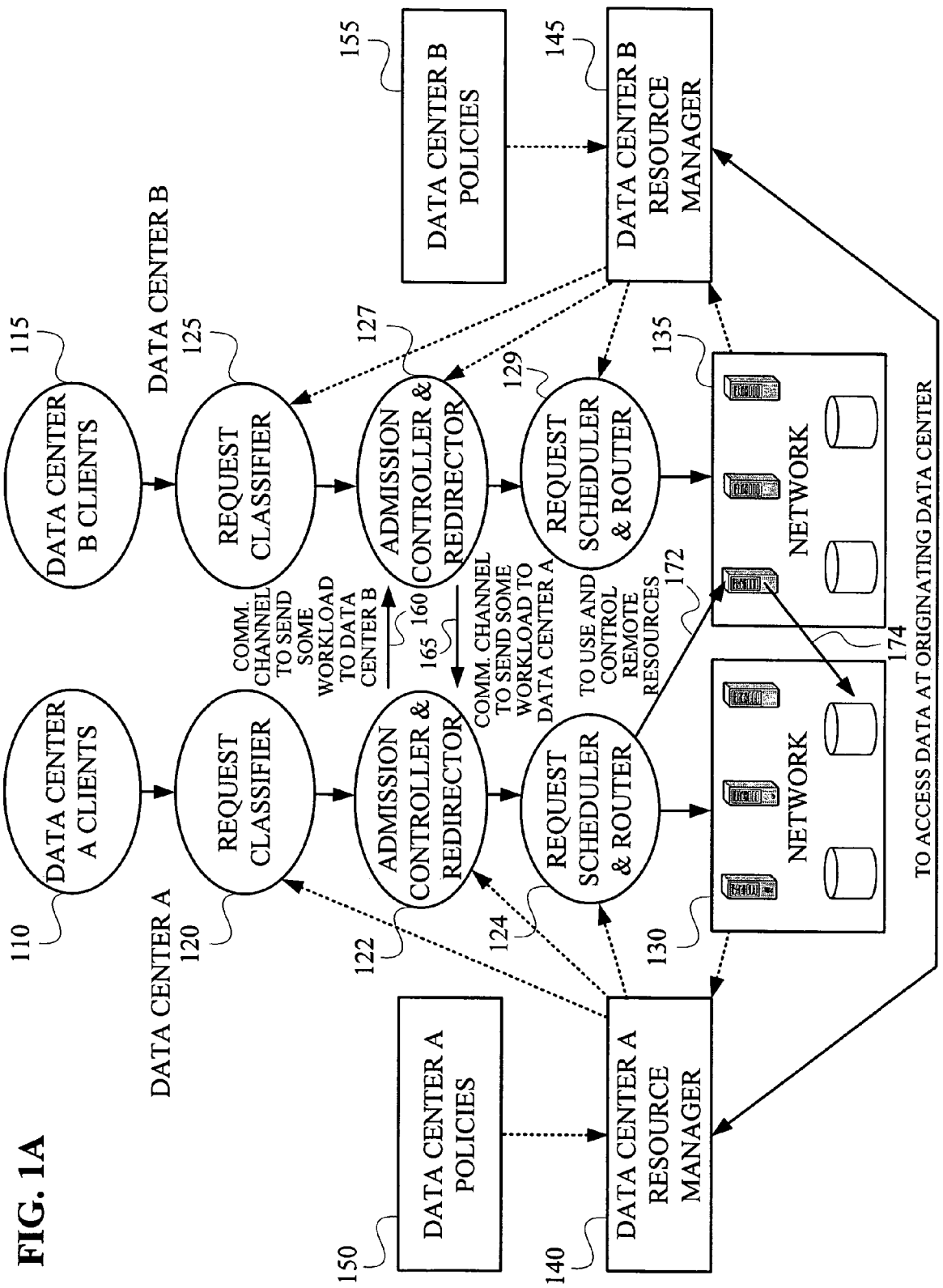
FIG. 1A is a block/flow diagram illustrating selective off-loading workload across multiple data centers, according to an embodiment of the present invention.

Referring initially to FIG. 1A, a block/flow diagram illustrates techniques for selectively off-loading workload across multiple data centers, according to an embodiment of the present invention. The figure shows two data centers, Data Center A and Data Center B. Although the embodiment is described in terms of two data centers, principles of the invention are not restricted to two data centers. That is, principles of the invention can be used for any number of data centers.

As shown, Data Center A has the following components: clients who produce workload 110, a request classifier 120, an admission controller and redirector 122, a request scheduler and router 124, a resource manager 140, a set of policies 150, and computing resources 130 such as processors, network, and storage.

Similarly, Data Center B has the following components: clients who produce workload 115, a request classifier 125, an admission controller and redirector 127, a request scheduler and router 129, a resource manager 145, a set of policies 155, and computing resources 135 such as processors, network, and storage.

Data Center A can send some of its workload to Data Center B using network communications channels (step 160). Similarly, Data Center B can send some of its workload to Data Center A using network communications channels (step 165).

Data Center A can also use resources at Data Center B directly by using communication channels (step 172), which might require the resources so used at Data Center B to access data at Data Center A using communication channels (step 174). Data Center B can also use Data Center A resources directly but for the purposes of keeping the diagram simple such interaction is not expressly shown.

In Data Center A, when the workload arrives from clients 110, it is in the form of work requests, and the work requests are placed in the request queue at the workload classifier 120, where the classifier separates the requests into different classes and forwards them to the admission controller and redirector 122. The admission controller decides whether to admit the request for local processing at the present time or hold off until an appropriate time. The admitted requests are then forwarded to the request scheduler and router 124, which sends them to be processed on the resources 130 allocated for the work request handling. The resource manager 140 uses individual data center policies 150 to determine classification criteria, admission control criteria, scheduling and routing decisions, as well as actual resources that should be used for a class of requests. An embodiment of the decision process used by the resource manager is described subsequently. The classification criteria, as determined by the resource manager, are sent to the workload classifier 120, the admission control criteria are sent to the admission controller 122, and the scheduling and routing criteria are sent to the scheduler and router 124. The resource manager updates these criteria and associated parameters dynamically and feeds those continuously to the control units 120, 122, and 124.

Work requests are classified and scheduled in a similar manner in Data Center B. When there is no resource sharing between the data centers, each data center uses its own resources to satisfy the work requests.

When the number of requests or the aggregate service time of the requests at Data Center A becomes too high, then in accordance with principles of the invention, resources from Data Center B can be used to process Data Center A's work requests. Resource sharing between data centers may be based on the policies defined at both the requesting and offering data centers.

Figure 1B:
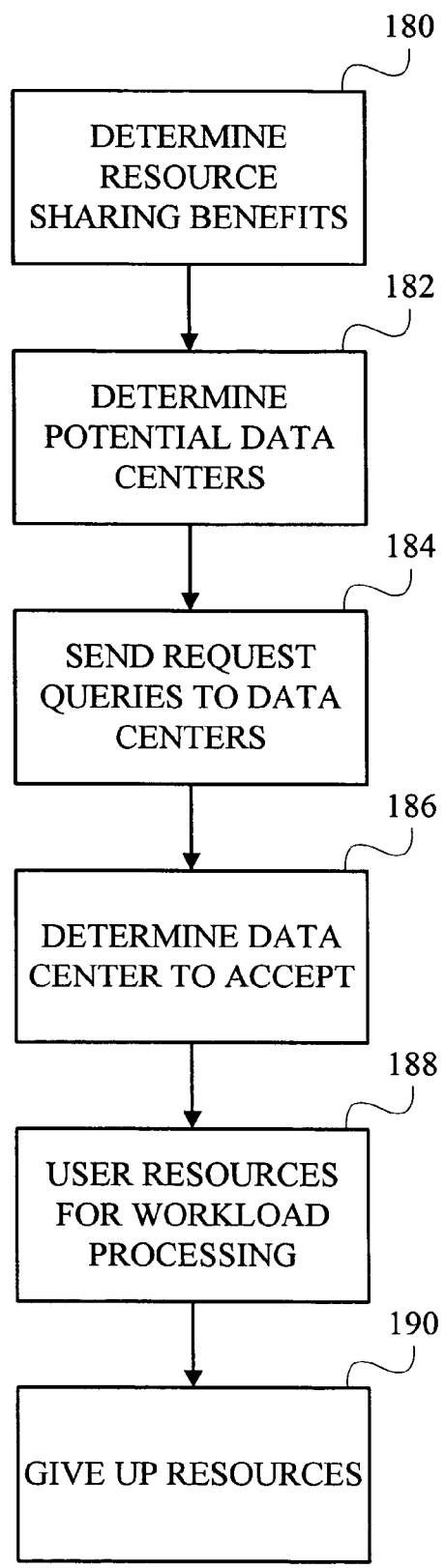
FIG. 1B is a flow diagram illustrating a resource borrowing and workload off-loading request process, according to an embodiment of the present invention.

An embodiment of the decision making process used by the resource manager in determining resource borrowing and workload off-loading is shown in FIG. 1B. As shown, the steps involved in borrowing resources are as follows.

In step 180, the benefits of borrowing resources are determined at the requesting data center.

In step 182, data centers to query for potential resource sharing are determined.

In step 184, queries requesting resource sharing are sent to the potential data centers.

In step 186, upon receiving responses to the request, the requesting data center determines which one to accept.

In step 188, the requesting data center uses the resources for workload processing.

In step 190, upon completion of processing the given workload, the requesting data center gives up the borrowed resources.

Further details of these steps are as follows.

The requesting data center evaluates the benefits of borrowing resources against the costs associated with the additional communication and of remote resource usage. The benefit could be in terms of metrics such as a global resource utilization level and/or performance relative to service level agreements. The threshold for triggering remote resource acquisition, referred to herein as the "borrow threshold," is a part of the requester policy. The borrow threshold can be adaptive so that a constant decay factor is applied to it after every resource optimization cycle in a data center. This will eventually allow remote resource acquisition even for smaller benefit values. However, when a request fails to acquire remote resources, the threshold can be reset to the original bigger value, thus avoiding too many failed searches for remote resources. Since the data center might simultaneously need resources for different priority workloads, the requests for the high benefit workloads may be processed first.

Once a decision is made to borrow resources, the next step is to choose the peers which can potentially lend resources. The set of accessible data centers is either defined by the organizational boundary of the enterprise or contracts with a provider outside the enterprise or by an organizational policy.

One possible way to look for remote resources is multicasting of the request to all peers. Request multicasting works well when the data centers use a two phase process for accepting remote requests, where in the first phase resource availability and constraints are returned to a requesting data center and upon confirmation the final acceptance is completed. The confirmation timeout at the lending data center decides when the resources are reclaimed back from the phase 1 stage. Upon confirmation from the requester, the reservation is activated. In the case where these reservations are made in advance based on predictions from a capacity planner, reservation activation is done (i.e., resources are deployed and software hosting stacks are installed and configured or otherwise made available for use) as a separate phase. The multi-stage approach ensures that the requester has an option to negotiate between data centers for acquiring the resource.

If data centers do not support a multi-phase acceptance scheme, the potential data centers may be ordered by priority according to various affinity measures, such as network latency, resource capabilities, known availability of resources and reputation, and resources are requested from the potential data centers in the priority order.

Similarly, the provider data center evaluates the benefits of lending resources compared to keeping the resources idle. Provider policies can be dynamic and thus reflect provider's workload and current system state. If a data center is requesting remote resources for a continuous period of time, its own threshold for accepting incoming requests for those resources can be set very high. This way, the data center rejects incoming requests quickly, rather than trying to look for available resources. This is what we refer to as a "cycle breaking rule," which serves to prevent a scenario wherein one data center requests remote resources and at the same time leases out local resources to process requests from remote data centers. Also, another step to be performed is identifying compatible resources for leasing out and the cost for the lease.

Figure 1C:
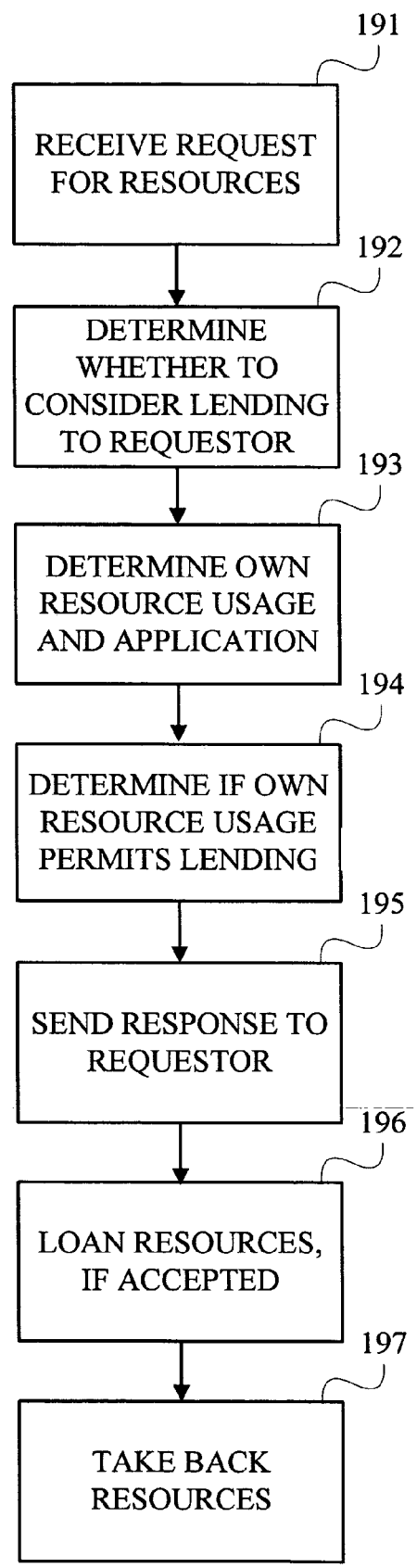
FIG. 1C is a flow diagram illustrating a resource lending process, according to an embodiment of the present invention.

FIG. 1C illustratively describes the decision making process in the provider's resource manager.

In step 191, the request for resources is received.

In step 192, a determination whether to consider resource lending to the requester is made.

In step 193, a determination of the potential lender's own data center resource usage and application is made.

In step 194, a determination of whether the potential lender's own resource usage permits lending resources is made.

In step 195, based on step 194, a response is sent back to requestor.

In step 196, if accepted, the resources are loaned.

In step 197, when remote usage is complete, the loaned resources are taken back.

It is to be appreciated that once the resource availability information is determined from one or more data centers, the resource selection is performed according to data center and workload policies. Various requests originating for an application may have dependencies among themselves. For example, additional processing in an application server tier may also necessitate additional processing in the database tier. The dependencies arise out of an application's logical deployment structures, which describe the type of resources needed and their inter-relationships. Resource selection would use these dependencies to decide which data center to use. Also, these dependencies can be used to prune requests that are sent out, e.g., only if the first dependency is met, try the next.

When the requester accepts a response, the next step is to provision the resources, e.g., configure them, install operating system, middleware, and application software. There are three possibilities: (1) the requester carries out provisioning on the remote resources; (2) the providing data center carries out the provisioning process; or (3) some combination of (1) and (2). Based on the choice above, the resource provisioning mechanism varies.

In the first case, appropriate workflows are carried out on the requesting end to complete the resource acquisition. In the second case, the workflows are either available or made available at the provider end. The first case provides flexibility, while the second case provides more autonomy and security. The third case is a hybrid of the first two cases. In a hybrid approach, the requester and provider coordinate and jointly provision the resources.

Figure 2:
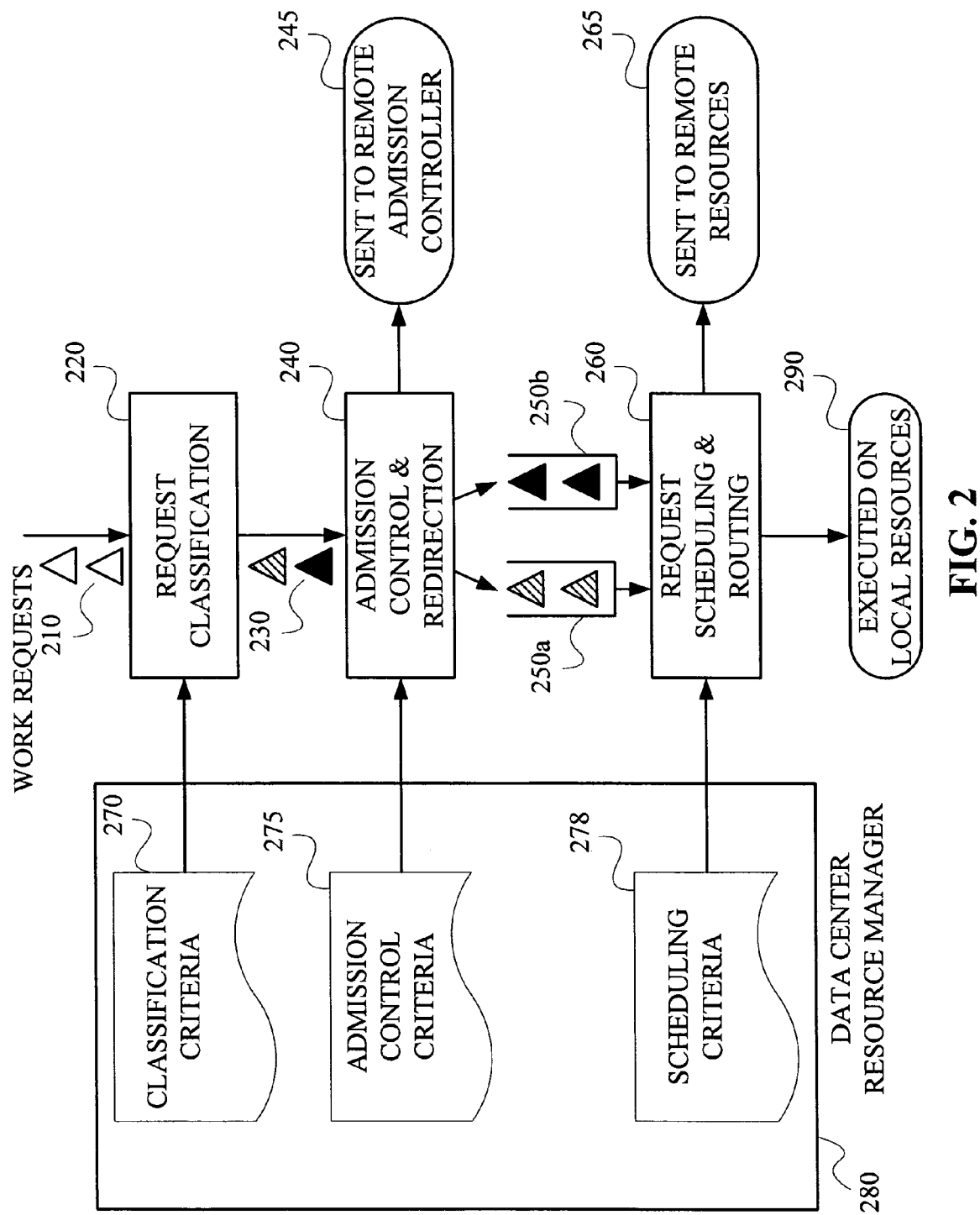
FIG. 2 is a block/flow diagram illustrating processing of work request flows, according to an embodiment of the present invention.

Once the remote resources are acquired and provisioned, the work request flows may be handled as illustrated in FIG. 2, which is a block/flow diagram illustrating processing of work request flows, according to an embodiment of the present invention.

As shown, Data Center A receives work requests 210, which are classified in the request classification step 220. The classification is based on the classification criteria 270 in the data center resource manager 280. The resulting classified requests 230 are processed for admission control and redirection. Some of the classified requests at step 240 are redirected to Data Center B to be processed 245, while other classified requests 250a and 250b are handled locally. The admission control criteria 275 in the data center resource manager 280 determine which type and what proportion of traffic should be redirected. Data Center B processes the redirected workload along with the rest of the workload arriving at Data Center B.

In another embodiment, instead of routing requests at the admission controller level, remote resources can be taken over by the local resource manager and these resources thus acquired can be made available to the local request scheduler and router. This is also illustrated in FIG. 2, where the request scheduling and routing step 260 treats the remote resources as if they are local resources and, based on their performance characteristics, directs a portion of the classified workload to them. Scheduling criteria 278 defined by the data center resource manager 280 determines the distribution of the workload, by type and by proportion, among the available resources. It also determines the processing priority of the workload requests.

A third case is where a combination of controls is applied, i.e., both workload redirection and remote resource control are applied. The admission controller of Data Center A sends a portion of requests to the admission controller of Data Center B. In addition, a resource from Data Center B is made available to the request scheduler and router of Data Center A with the same data access variations as discussed above.

Thus, in accordance with principles of the invention, mechanisms are provided for relieving congestion on Data Center A by allocating and sharing unused or under utilized resources from other data centers. Two of such mechanisms are admission control with redirection, and scheduling workload among local and remote resources. A hybrid approach that combines the two mechanisms is also provided.

Figure 3:
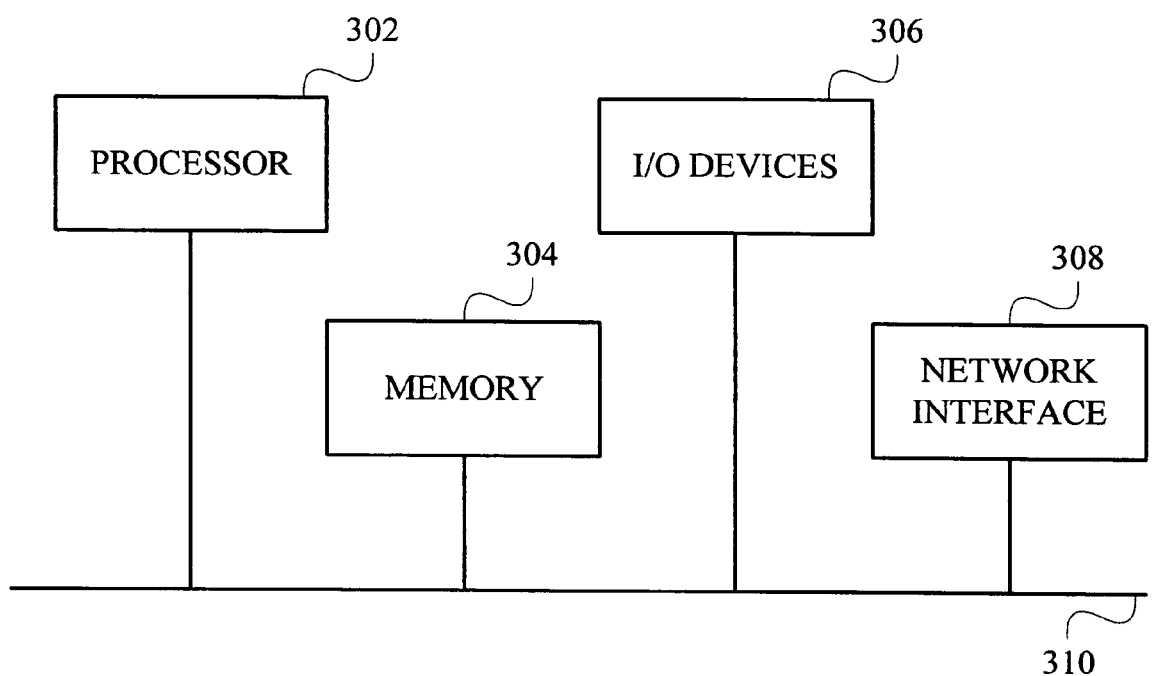
FIG. 3 is a diagram illustrating a computing system in accordance with which one or more components/steps of selective workload off-loading techniques may be implemented, according to an embodiment of the present invention.

Shown in FIG. 3, is a computing system in accordance with which one or more components/steps of selective workload off-loading techniques (e.g., components and methodologies described in the context of FIGS. 1A, 1B and 2) may be implemented, according to an embodiment of the present invention. It is to be understood that the individual components/steps may be implemented on one such computer system or on more than one such computer system. In the case of an implementation on a distributed computing system, the individual computer systems and/or devices may be connected via a suitable network, e.g., the Internet or World Wide Web. However, the system may be realized via private or local networks. In any case, the invention is not limited to any particular network.

Thus, the computing system shown in FIG. 3 represents an illustrative computing system architecture for implementing, among other things, one or more functional components of a data center, e.g., a request classifier, an admission controller and redirector, a request scheduler and router, a resource manager, and a set of policies. Further, the computing system architecture may also represent an implementation of one or more of the actual computing resources provided by data center. Still further, the computing system architecture may also represent an implementation of one or more clients.

As shown, the computing system architecture may comprise a processor 302, a memory 304, I/O devices 306, and a communication interface 308, coupled via a computer bus 310 or alternate connection arrangement. In one embodiment, the computing system architecture of FIG. 3 represents one or more servers associated with a data center.

It is to be appreciated that the term "processor" as used herein is intended to include any processing device, such as, for example, one that includes a CPU and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Accordingly, as explained herein, principles of the invention provide techniques for using remote resources to handle a class of work requests. Such techniques may include a determination to use remote resources and acquisition of remote resources based on policies. Such techniques may also include a determination to provide resources for a requesting site based on policies, as well as a derivation of a set of criteria that will be used for handling requests. Further, such techniques may include handling of user requests that further comprises classifying user requests based on the request classification criteria, dynamically and optionally redirecting a portion of the user requests based on the class of the request to remote resources, and dynamically and optionally using remote resources for processing a class of requests. Still further, such techniques may include giving up use of remote resources based on policies.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of processing a user request in accordance with multiple data centers, comprising the steps of:

obtaining, at a first data center, a user request from a requesting user;

classifying the user request based on one or more classification criterion;

off-loading at least a portion of a workload associated with the classified user request to at least a second data center to be processed, wherein the off-loading step is at least based on one or more administrative policies associated with at least one of the first data center and the second data center;

processing the workload such that the user request is satisfied in accordance with a service level agreement for the requesting user;

wherein each of the multiple data centers is operative to process the user request; and determining, at the first data center, one or more metric values associated with one or more benefits to off-loading a portion of the workload, wherein the determining step further comprises:

comparing the metric value to a threshold value and using a result of the comparison as a trigger to initiate workload off-loading; and adjusting the threshold value, wherein the threshold value adjusting step further comprises applying a constant decay factor to the threshold value, and resetting the threshold value to an original value when the step of off-loading the portion of the workload is unsuccessful;

wherein the off-loading step further comprises causing at least one resource associated with the second data center to be made available to a resource scheduler associated with the first data center such that at least a portion of a workload associated with the classified user request can be routed directly to the at least one resource associated with the second data center.

2. The method of claim 1, wherein the off-loading step further comprises redirecting at least a portion of a workload associated with the classified user request to the second data center based on one of the one or more administrative policies associated with the first data center, wherein the administrative policy comprises an admission control policy.

3. The method of claim 1, further comprising the step of determining from among multiple data centers which one or more data centers are potential data centers for off-loading at least a portion of the workload.

4. The method of claim 3, wherein the potential data center determining step further comprises determining potential data centers on a priority order basis.

5. The method of claim 3, further comprising the step of sending at least one request query to at least one of the data centers determined to be a potential data center.

6. The method of claim 3, further comprising the step of multicasting a request query to multiple data centers.

7. The method of claim 6, further comprising the step of accepting one of the potential data centers as the data center to be used to off-load, wherein the second data center is the accepted data center.

8. The method of claim 7, further comprising the step of selecting one or more resources to be provisioned.

9. The method of claim 8, further comprising the step of provisioning one or more selected resources for use in processing the workload.

10. The method of claim 9, wherein the resource provisioning step further comprises at least one of the first data center and the second data center performing at least a portion of the resource provisioning step.

11. The method of claim 1, further comprising the step of adjustably setting, at the first data center, a resource request threshold value.

12. The method of claim 1, wherein the off-loading step further comprises the second data center determining its own resource availability before agreeing to lend one or more resources for processing the workload.

13. Apparatus for processing a user request in accordance with multiple data centers, comprising:

a memory; and at least one processing device associated with a first data center, coupled to the memory, and operative to: (i) obtain a user request from a requesting user; (ii) classify the user request based on one or more classification criterion; (iii) cause to be off-loaded at least a portion of a workload associated with the classified user request to at least a second data center to be processed, wherein the off-loading operation is at least based on one or more administrative policies associated with at least one of the first data center and the second data center; wherein the workload is processed such that the user request is satisfied in accordance with a service level agreement for the requesting user, wherein each of the multiple data centers is operative to process the user request; and (iv) determine, at the first data center, one or more metric values associated with one or more benefits to off-loading a portion of the workload, wherein the determining operation further comprises: comparing the metric value to a threshold value and using a result of the comparison as a trigger to initiate workload off-loading; and adjusting the threshold value, wherein the threshold value adjusting operation further comprises applying a constant decay factor to the threshold value, and resetting the threshold value to an original value when the step of off-loading the portion of the workload is unsuccessful; wherein the off-loading step further comprises causing at least one resource associated with the second data center to be made available to a resource scheduler associated with the first data center such that at least a portion of a workload associated with the classified user request can be routed directly to the at least one resource associated with the second data center.

14. The apparatus of claim 13, wherein the off-loading operation further comprises redirecting at least a portion of a workload associated with the classified user request to the second data center based on one of the one or more administrative policies associated with the first data center, wherein the administrative policy comprises an admission control policy.

15. The apparatus of claim 13, wherein the at least one processing device is further operative to determine from among multiple data centers which one or more data centers are potential data centers for off-loading at least a portion of the workload.

16. An article of manufacture for use at a first data center in processing a user request in accordance with multiple data centers, comprising a machine readable storage medium containing one or more programs which when executed implement the steps of:

obtaining a user request from a requesting user;

classifying the user request based on one or more classification criterion;

causing to be off-loaded at least a portion of a workload associated with the classified user request to at least a second data center to be processed, wherein the off-loading operation is at least based on one or more administrative policies associated with at least one of the first data center and the second data center; wherein the workload is processed such that the user request is satisfied in accordance with a service level agreement for the requesting user, wherein each of the multiple data centers is operative to process the user request; and determining, at the first data center, one or more metric values associated with one or more benefits to off-loading a portion of the workload, wherein the determining step further comprises:

comparing the metric value to a threshold value and using a result of the comparison as a trigger to initiate workload off-loading; and adjusting the threshold value, wherein the threshold value adjusting step further comprises applying a constant decay factor to the threshold value, and resetting the threshold value to an original value when the step of off-loading the portion of the workload is unsuccessful;

wherein the off-loading step further comprises causing at least one resource associated with the second data center to be made available to a resource scheduler associated with the first data center such that at least a portion of a workload associated with the classified user request can be routed directly to the at least one resource associated with the second data center.

* * * * *